(12) United States Patent
Lee et al.

(10) Patent No.: US 8,323,547 B2
(45) Date of Patent: Dec. 4, 2012

(54) MICROPOROUS POLYETHYLENE FILM MANUFACTURED ACCORDING TO LIQUID-LIQUID PHASE SEPARATION AND METHOD OF PRODUCING THE SAME

(75) Inventors: Young-Keun Lee, Daejeon (KR); Jang-Weon Rhee, Daejeon (KR); Jung-Moon Sung, Seoul (KR); Byoung-Cheon Jo, Daejeon (KR); Chol-Ho Lee, Daejeon (KR); Gwi-Gwon Kang, Daejeon (KR); In-Hwa Jung, Cheonan (KR); Je-An Lee, Daejeon (KR)

(73) Assignee: SK Innovation Co., Ltd. (KR)

( * ) Notice: Subject to any disclaimer, the term of this patent is extended or adjusted under 35 U.S.C. 154(b) by 1287 days.

(21) Appl. No.: 11/753,174

(22) Filed: May 24, 2007

(65) Prior Publication Data

US 2007/0232709 A1 Oct. 4, 2007

Related U.S. Application Data

(63) Continuation-in-part of application No. 10/545,203, filed as application No. PCT/KR2005/001894 on Jun. 18, 2005, now abandoned.

(30) Foreign Application Priority Data

May 16, 2005 (KR) .................. 10-2005-0040815

(51) Int. Cl.
- *B29C 51/00* (2006.01)
- *D02J 1/22* (2006.01)
- *C08J 9/00* (2006.01)
- *C08J 5/18* (2006.01)

(52) U.S. Cl. .............. 264/235.8; 264/288.8; 521/79; 429/254; 429/145

(58) Field of Classification Search ............. 521/80, 521/79; 264/235.8, 288.8; 429/254, 145
See application file for complete search history.

(56) References Cited

U.S. PATENT DOCUMENTS

| 4,247,498 | A | | 1/1981 | Castro |
| 4,539,256 | A | * | 9/1985 | Shipman ............... 428/315.5 |
| 4,726,989 | A | | 2/1988 | Mrozinski |
| 4,867,881 | A | | 9/1989 | Kinzer |
| 5,051,183 | A | | 9/1991 | Takita et al. |
| 5,830,554 | A | | 11/1998 | Kaimai et al. |
| 6,096,213 | A | * | 8/2000 | Radovanovic et al. .. 210/500.36 |
| 6,245,272 | B1 | * | 6/2001 | Takita et al. ............ 264/210.4 |
| 6,566,012 | B1 | | 5/2003 | Takita et al. |
| 6,783,889 | B2 | * | 8/2004 | Kubota et al. ............ 428/847.1 |

FOREIGN PATENT DOCUMENTS

| JP | 2000-017100 | 1/2000 |
| JP | 2004-196871 | 7/2004 |

OTHER PUBLICATIONS

Aggarwal et al., "Polyethylene: Preparation, Structure, and Properties." Oct. 22, 1956. Chemical Reviews vol. 57, Issue 4. pp. 1 and 683.*
CN Office Action—CN Patent Application No. 200580051082.1.

* cited by examiner

*Primary Examiner* — Randy Gulakowski
*Assistant Examiner* — Kara Boyle
(74) *Attorney, Agent, or Firm* — Cantor Colburn LLP

(57) ABSTRACT

Disclosed in the present invention are a microporous polyethylene film and a method of manufacture thereof. The polyethylene microporous film manufactured according to the present invention may contribute to an increased productivity of stable products as its extrusion and stretching may be done readily. And thus manufactured product may be used for battery separators and various filters owing to its high gas permeability, superior puncture strength, and small ratio of shrinkage.

15 Claims, No Drawings

MICROPOROUS POLYETHYLENE FILM MANUFACTURED ACCORDING TO LIQUID-LIQUID PHASE SEPARATION AND METHOD OF PRODUCING THE SAME

CROSS REFERENCE TO RELATED APPLICATIONS

This application is a continuation-in-part application of U.S. application Ser. No. 10/545,203 filed Aug. 9, 2005, which is the U.S. National Stage of application PCT/KR05/01894 having an International Filing Date of Jun. 18, 2005, which claims priority to and the benefit of Korean Patent Application No. 2005-0040815 filed on May 16, 2005, all of which are incorporated by reference herein in their entireties.

BACKGROUND OF THE INVENTION

1. Field of the Invention

The present invention is related to a microporous polyethylene film and a method of producing the same. More concretely, the present invention is related to a microporous polyethylene film having superior extrusion-compoundability, stretchability, puncture strength, and gas permeability to increase the performance and stability of batteries using the film and a method of producing the same.

2. Description of the Prior Art

Microporous polyolefin films have been used extensively as various battery separators, separation filters, and ultrafiltration membranes owing to their superior chemical stability and physical properties.

The methods of manufacture of microporous films from polyolefins may be divided into three: The first method is processing a polyolefin into a thin fiber to produce a nonwoven fabric-shaped microporous film; the second method is a dry process, in which a thick polyolefin film is made and stretched at a low temperature to create micro cracks among lamellas corresponding to the crystalline portion of the polyolefin, and eventually, to form micropores in the polyolefin; and the third method is a wet process, in which a polyolefin is compounded with a diluent at a high temperature to make a single phase, phase separation of the polyolefin and diluent is initiated in the cooling step, and the diluent is extracted to form pores in the polyolefin. Among them, the third method, i.e., a wet process, is used widely for the manufacture of separator films of the secondary batteries such as lithium ion batteries, etc. since microphorous films manufactured according to the third method are able to produce thin films, with superior physical properties.

The method of manufacture of porous films according to the wet process is further divided into the solid-liquid phase separation method and liquid-liquid phase separation method according to which steps the single phase mixtures of polymers and diluents go through for phase separation and how they make pores. Both methods are the same up to the step of making a single phase mixture by mixing polymers and a diluent at a high temperature. But in case of solid-liquid phase separation, no phase separation occurs until polymers are crystallized and become a solid. In other words, since phase separation occurs as polymer chains are crystallized and the diluent is pushed out to the outside of crystals, it is disadvantageous in that the size of the phase separation is very small considering the size of polymer crystals, and it is not possible to control the structure, such as the shape, size, etc., of the separated phase variously. In this case, the application of porous films to the secondary battery separator films having a high permeability required by high-capacity secondary batteries being developed by the manufacturers of the secondary batteries would be limited. It has been also known that there have been no ways of increasing mechanical strength other than the basic way of increasing the molecular weight of polymer resins such as mixing of ultrahigh-molecular-weight polyethylene that is costly and difficult to be mixed, and increases the load of extrusion greatly, etc. The typical composition of solid-liquid phase separation known extensively is mixing polyolefin resins with paraffin oil or mineral oil, which is introduced in U.S. Pat. No. 4,539,256, No. 4,726,989, No. 5,051,183, No. 5,830,554, No. 6,245,272, No. 6,566,012, etc.

In case of liquid-liquid phase separation, phase separation of a liquid-state polymer material and also a liquid-state diluent occurs by thermodynamic instability at a temperature higher than that of crystallization of the polymers before the polymers are crystallized and hardened to be a solid. The changes of each phases according to the conditions for phase separation and composition and concentration of each phases of phase separation have been established well in the academic field. Microporous films manufactured according to liquid-liquid phase separation are advantageous in that not only the size of pores becomes greater up to about 2 to 1,000 times than that of microporous films manufactured according to solid-liquid phase separation basically, and the temperature of liquid-liquid phase separation and the size of the phase may be controlled according to the type of the polymer and the combination of the diluent, but also the size of the phase may be controlled variously according to the difference between the temperature of thermodynamic liquid-liquid phase separation and the temperature of progressing actual phase separation, and the residence time in each step.

In U.S. Pat. No. 4,247,498, the combination of many various polymers and diluents that may be liquid-liquid phase-separated is introduced, and the possibility of making products having a thickness in an extensive range by extracting the diluent among thus liquid-liquid phase-separated compositions is described. Disclosed in U.S. Pat. No. 4,867,881 is an invention for the manufacture of oriented microporous films through stretching, extracting, drying, and heat-setting of the compositions manufactured through liquid-liquid phase separation. The methods disclosed in the above patents are limited in obtaining simultaneously superior mechanical strength and permeability that are essential physical properties for the secondary battery separators due to difficulties in offering a sufficient time for phase separation, showing effects of phase separation, and controlling pore sizes during the extrusion and cooling processes since liquid-liquid phase separation occurs in a relatively short time of a few seconds during which the resin mixture is extruded in a thermodynamically single-phase form while maintaining a temperature higher than that of liquid-liquid phase separation up to mixing and extrusion, and this molten resin material is cooled through a casting roll, etc. after it is extruded to the atmosphere. Particularly, in U.S. Pat. No. 4,867,881, nothing is mentioned specially as to the temperature of stretching in claims, but in preferred embodiments in which high-density polyethylene, the temperature of stretching is described to be lower than the melting temperature of high-density polyethylene by 20 degrees to the minimum or by 60 degrees to the maximum. In this case, a tearing phenomenon of the polymer occurs by forced low-temperature stretching, which leads to a better permeability eventually. It is deemed that a rapid increase in permeability by increasing the ratio of stretching supports this phenomenon well in preferred embodiments. However, such low-temperature stretching is deemed to be a method performed as it is not possible to obtain the structure of pores sufficiently during the processes of extrusion and cooling, and it is disadvantageous in that not only there is a high possibility of producing needle holes or abnormal-sized large holes, that are the most critical defects of battery separator products when performing low-temperature stretching, but also the danger of breakage of sheets is also increased.

Accordingly, the inventors of the present invention have conducted extensive studies in order to solve the problems with prior art, and found that it has been possible to obtain microporous films showing a high permeability by obtaining desired degree of phase separation and size of pores by controlling extensively the temperature and residence time in the phase-separated state by performing liquid-liquid phase separation in an extruder after polyethylene and the diluent are mixed into a single phase. At the same time, they completed the present invention knowing the fact that when liquid-liquid phase separation is sufficiently progressed, higher mechanical strength can be obtained even with the same molecular weight because the stretching is possibly able to be done at a temperature close to the melting temperature of polyethylene thus granting more orientation effect of polyethylene, due to the low diluent content in polyethylene rich phase.

SUMMARY OF THE INVENTION

It is, therefore, an object of the present invention to provide with a polyethylene microporous film having a superior mechanical strength while having a high permeability, that may be used as a high-capacity secondary battery separator.

Another object of the present invention is to provide with a method of manufacture of the above microporous polyethylene film with a high productivity through economic processes.

The microporous polyethylene film according to the present invention in order to fulfill the above-described objects is characterized by being manufactured according to a method comprising the steps of:

melt-mixing a resin mixture, containing 20-55 weight % of polyethylene (component I) and 80-45 weight % of a diluent (component II) characterized by liquid-liquid phase separation from the above component I at 160-280° C., at a temperature higher than the temperature of liquid-liquid phase separation to make a thermodynamic single phase in an extruder;

extruding the above single-phase molten material through dies by progressing liquid-liquid phase separation by passing it through a zone controlled to be in a temperature range of liquid-liquid phase separation;

molding the molten material extruded as liquid-liquid phase separation is progressed in the form of a sheet;

stretching the above sheet to have a ratio of stretching of 4 times or greater each in the machine and transverse directions and the total ratio of stretching of 25-50 times in the sequential or simultaneous stretching method including the roll or tenter method;

extracting component II from the stretched film and drying it; and heat-setting the dried film by removing its residual stress to have a ratio of shrinkage of the film in each of the machine and transverse directions of 5% or less.

The present invention is illustrated in more detail below:

As described in the above, the present invention is to provide with a microporous polyethylene film for battery separators having a high permeability, no problem in its processing due to the increase in its molecular weight, and a superior mechanical strength by controlling the size of pores through sufficient phase separation in an extruder, and increasing the stretching processibility by reducing the content of the diluent in the phase of phase-separated polyethylene, and maximizing orientation effects during stretching.

The basic theory of making a microporous polyethylene film from polyethylene used in the present invention is as follows:

A low-molecular-weight organic material that is compatible partially with polyethylene according to the temperature (hereinafter referred to as a "diluent") may form a thermodynamically single phase with polyethylene at a higher temperature than the melting temperature of polyethylene. If this solution of polyethylene and diluent in the thermodynamically single phase is cooled slowly, phase separation of polyethylene and diluent occurs during the cooling process prior to the crystallization and solidification of polyethylene. Since both of polyethylene and diluent are phase-separated in the liquid state, this is called liquid-liquid phase separation. Each phase separated at this time is composed of a polyethylene rich phase, in which most of the content is polyethylene, and a diluent rich phase composed of a small amount of polyethylene melted in a diluent and the diluent. The size of the two phases separated thermodynamically becomes larger by a coarsening action during which the same phases gather together as time passes by if both of the two phases are in the mobile state (or temperature). The degree of increase in the size of phases separated according to the coarsening action varies according to the residence time in the liquid-liquid phase separation state and the temperature at which the liquid-liquid phase separation state is maintained. That is, the longer the residence time is (it is proportional to ¼ square of the residence time), and the greater the difference between the temperature of liquid-liquid phase difference and the temperature of actual progress of liquid-liquid phase separation is, the greater the size of each phase is. Increase in the size of each phase is stopped when the temperature of the molten material is lowered below the temperature of crystallization of the polyethylene rich phase and that phase is crystallized. Accordingly, a microporous polyethylene film is made by progressing liquid-liquid phase separation of the molten material, cooling these phases completely to solidify the polyethylene rich phase, and extracting the diluent rich phase with an organic solvent.

Therefore, the basic pore structure of the microporous film is determined during the phase separation process. In other words, the size and structure of the diluent rich phase made after phase separation determine the size and structure of pores of the final microporous film. Therefore, it is possible to control the pore structure according to the temperature of thermodynamic phase separation, speed and time of phase separation during processing, temperature and depth of phase separation inducement, etc. of a composition.

Also, the basic physical properties of a microporous film are determined according to the concentration of polyethylene in the polyethylene rich phase during the phase separation process. If the concentration of polyethylene in the polyethylene rich phase is increased sufficiently as phase separation is completed sufficiently, the increase in mechanical strength after stretching becomes greater as the mobility of polyethylene chains is lowered resulting in the increase in forced orientation effects during stretching after cooling. That is, if it is assumed that liquid-liquid phase separation is sufficiently progressed, polyethylene rich phase is well developed, by using the resin having the same molecular weight, a much more superior mechanical strength can be obtained compared to those of insufficiently phase separated cases.

As a result of long-term studies, the inventors of the present invention found the followings: In order to obtain superior permeability and mechanical properties simultaneously that are required as superior battery separators, the size of the diluent rich phase should be increased by progressing liquid-liquid phase separation sufficiently and the orientation effect of polyethylene should be maximized during stretching processing in the post process by having highly concentrated polyethylene exist in the polyethylene rich phase as much as possible; and, as described in the above, what affects greatly are the compositions and processing conditions for sufficient progress of liquid-liquid phase separation.

As a result of manufacturing products by controlling the degree of liquid-liquid phase separation in an extruder by using a composition having a proper temperature for phase separation based on the above, it was possible to make a microporous polyethylene film having superior permeability and mechanical properties even with a lower-molecular-weight resin compared to those of prior art, and to improve processibility greatly.

The microporous polyethylene film according to the present invention is characterized by being manufactured according to a method comprising the steps of:

melt-mixing a resin mixture, containing 20-55 weight % of polyethylene (component I) and 80-45 weight % of a diluent (component II) characterized by liquid-liquid phase separation from the above component I at 160-280° C., at a temperature higher than the temperature of liquid-liquid phase separation to make a thermodynamic single phase in an extruder;

extruding the above single-phase molten material through dies by progressing liquid-liquid phase separation by passing it through a zone controlled to be in a temperature range of liquid-liquid phase separation;

molding the molten material extruded as liquid-liquid phase separation is progressed in the form of a sheet;

stretching the above sheet to have a ratio of stretching of 4 times or greater each in the machine and transverse directions and the total ratio of stretching of 25-50 times in the sequential or simultaneous stretching method including the roll or tenter method;

extracting component II from the stretched film and drying it; and heat-setting the dried film by removing its residual stress to have a ratio of shrinkage of the film in each of the machine and transverse directions of 5% or less.

Materials for microporous polyethylene films commonly used in prior art include many polyethylenes (low-density polyethylene, linear low-density polyethylene, high-density polyethylene, etc.) and polypropylene, etc. However, polyethylene and polypropylene excluding high-density polyethylene lower structural regularity of polymers, and thus, lower the degree of completion of lamella in the crystal portion of the resin itself and make thickness smaller. Also, if comonomers exist during the polymerization reaction, a large amount of low-molecular-weight molecules is produced as the reactivity of comonomers becomes lower than that of ethylene. Therefore, it is preferable that the content of comonomers is less than 2 weight % in case of high-density polyethylene. For the above comonomers, α-olefins such as propylene, 1-butene, 1-hexene, 4-methyl-1-pentene, 1-octene, etc. may be used, preferably, propylene, 1-butene, 1-hexene, or 4-methyl-1-pentene having a relatively high reactivity.

The weight average molecular weight of polyethylene is greater than $2 \times 10^5$ but less than $4.5 \times 10^5$, preferably between $3 \times 10^5$ and $4 \times 10^5$. If the weight average molecular weight is less than $2 \times 10^5$, it is not possible to obtain microporous films having superior final physical properties; and if it is greater than $4.5 \times 10^5$, the load of the extruder is increased due to the increase in viscosity during the extrusion process, compoundability is lowered due to a large difference in viscosity with that of the diluent, and the surface of the sheet being extruded becomes rough. In order to overcome these difficulties, the temperature of extrusion may be increased or the shear rate of the screw configuration of a screw compounder may be increased. However, in this case, the resin becomes deteriorated, physical properties of the resin are lowered, and the resins can be easily carbonized thus generates carbonized impurities which cause fish-eyes. Particularly, this problem may become more serious if ultrahigh-molecular-weight polyethylene is used.

Any organic liquid compound having a characteristic of liquid-liquid phase separation at 160-280° C. with a compositional ratio of 100% when being mixed with 20-55 weight % of polyethylene may be used for the diluent in the present invention. Examples of such organic liquid compounds include phthalic acid esters such as dibutyl phthalate, dihexyl phthalate, dioctyl phthalate, etc.; aromatic ethers such as diphenyl ether, benzyl ether, etc.; aliphatic acids having 10 to 20 carbon atoms such as palmitic acid, stearic acid, oleic acid, linoleic acid, linolenic acid, etc.; aliphatic alcohols having 10 to 20 carbon atoms such as palmitic acid alcohol, stearic acid alcohol, oleic acid alcohol, etc.; and among saturated and unsaturated fatty acids having 4 to 26 carbon atoms in the fatty acid group, fatty acid esters in which one or more fatty acids are combined through esterification with alcohols having 1 to 8 hydroxy radicals and 1 to 10 carbon atoms, such as palmitic acid mono-, di-, or triester; stearic acid mono-, di-, or triester; oleic acid mono-, di-, or triester; 1 linoleic acid mono-, di-, or triester, etc. as long as a compound meets the condition of liquid-liquid phase separation with polyethylene at 160-280° C., any mixture of the above compounds may be used. Particularly, it is also possible to mix and use one or more paraffin oil, mineral oil, and wax as long as a compound meets the condition of liquid-liquid phase separation with polyethylene at 160-280° C.

If the temperature of liquid-liquid phase separation is lowered to below 160° C., the temperature of the rear end portion of extrusion should be lowered sufficiently to below 160° C. for sufficient progression of liquid-liquid separation. However, in this case, polyethylene is not melted sufficiently, viscosity is increased greatly thus burdening the extruder mechanically, and the surface of the sheet becomes rough making normal extrusion processing not feasible since extrusion should be done at a temperature which is close to the melting point of polyethylene. On the contrary, if the temperature of liquid-liquid phase separation is increased to higher than 280° C., it is not possible to manufacture products having desired physical properties since the temperature is too high and the oxidation decomposition reaction of the composition is accelerated rapidly whereas the composition should be compounded at a sufficiently high temperature of higher than 280° C. in order to make a thermodynamically single phase during initial extrusion.

Preferably, the compositions of polyethylene and the diluent used in the present invention are 20-55 weight % and 80-45 weight %, respectively. If the content of polyethylene exceeds 55 weight % (i.e., if the content of the diluent is less than 45 weight %), permeability is reduced greatly as porosity is reduced, pore size becomes smaller, and interconnection among pores becomes small. On the other hand, if the content of polyethylene is less than 20 weight % (i.e., if the content of the diluent exceeds 80 weight %), there may occur problems such as breakage, uneven thickness, etc. during stretching as the compoundability between polyethylene and the diluent is lowered and polyethylene is extruded in the form of a gel without being compounded thermodynamically with the diluent.

If necessary, general additives for the improvement of specific functions such as oxidation stabilizers, UV stabilizers, anti-charging agents, etc. may be added further.

A mixture in the single phase is obtained through melt-extrusion of the above composition at a temperature higher than that of liquid-liquid phase separation of the composition by using a twin screw compounder, kneader, Banbury mixer, etc. designed for compounding of the diluent and polyethylene. Liquid-liquid phase separation is made progressed in the above processing machine by passing the single-phase molten material through a twin screw compounder, kneader, Bunbary mixer, or an inner section of such equipment, of which temperature is maintained to be lower than the temperature of liquid-liquid phase separation −10° C. for a residence time of longer than 30 seconds. The molten material of which phase is separated inside of the processing machine is molded in the form of a sheet by extruding through dies and cooling. Polyethylene and the oil are blended in advance and inputted into a compounder, or inputted into each of separated feeder. If the temperature for progressing phase separation in the processing machine is higher than the temperature of liquid-liquid phase separation −10° C., or the residence time in this phase separation section is less than 30 seconds, due to insufficient phase separation, a relatively large amount of the diluent exists jointly in the polyethylene rich phase and the size of pores becomes smaller, thus the orientation effects are lowered, and therefore, mechanical properties are not increased and permeability of the final products becomes less, respectively.

As to the methods of making sheet-formed molding products from molten materials, both of general casting and calendering methods using water-cooling and air-cooling may be used.

Next, stretching may be conducted in a roll-type or tenter-type sequential or simultaneous stretching manner, where it is preferable that the ratio of stretching is 4 times or greater each in the machine and transverse directions and the total ratio of stretching is 25-50 times. If the ratio of stretching in one direction is less than 4 times, orientation in that direction is not sufficient, and the physical balance between the machine and traverse direction is upset, and thus, the tensile strength, puncture strength, etc. are reduced. Also, if the total ratio of stretching is less than 25 times, non-uniform stretching occurs; and if the total ratio of stretching exceeds 50 times, it is very likely that breakage occurs during stretching and the ratio of shrinkage of the final film is undesirably increased. The temperature of stretching may vary according to the compositional ratio. However, it is preferable to perform stretching at a temperature lower than the melting temperature of polyethylene itself used by 3-20 degrees. If stretching is done at a temperature higher than the melting temperature of polyethylene by −3 degrees, the strength of the film inside of the stretching machine becomes too weak and stretching is done unevenly; and if stretching is done at a temperature lower than the melting temperature of polyethylene by 20 degrees, it is very likely that the products are defective as relatively large holes such as pin holes, etc. are made by tearing, and breakage of sheets occurs frequently while working.

The stretched film is extracted and dried by using an organic solvent. Organic solvents that may be used in the present invention are not limited specially, but any solvent that is capable of extracting the diluent used for the extrusion of the resin may be used. Preferably, compounds that are efficient for extraction and dried promptly such as methyl ethyl ketone, methylene chloride, hexane, etc. are proper. As to the methods of extraction, all general methods of extraction of solvents such as the immersion method, solvent spray method, ultrasonic method, etc. may be used singly or in combination with each other. During extraction, the content of the remaining diluent should be less than 2 weight %. If the content of the remaining diluent exceeds 2 weight %, physical properties are lowered and the permeability of the film is reduced. The amount of the remaining diluent (ratio of extraction) depends greatly on the temperature and time of extraction. As to the temperature of extraction, it is better to have a high temperature for the increase in the solubility of the diluent and solvent. But it is preferable to have a temperature of below 40° C. in view of the problem with stability by boiling of the solvent. The temperature of extraction should be higher than the solidification point of the diluent at all times since the efficiency for extraction is lowered greatly if the temperature of extraction is lower than the solidification point of the diluent. The time of extraction varies according to the thickness of the film to be produced. However, 2 to 4 minutes are proper when producing general microporous films having a thickness of 10 to 30 μm.

The dried film then goes through the heat-setting step in order to reduce the shrinkage of the final film to lower than 5% each in the machine and transverse directions by removing the residual stress. Heat-setting refers to removing of the residual stress by fixing the film, adding heat, and holding the film, that is subject to shrinkage, forcibly. It is advantageous to have a high temperature of heat-setting for lowering the ratio of shrinkage. However, if the temperature of heat-setting is too high, permeability is lowered as the film is melted partially and micropores formed are clogged. It is preferable to select the temperature of heat-setting within the temperature range within which 10-30 weight % of the crystalline portion of the film is melted. If the temperature of heat-setting is selected from the temperature range which is lower than the temperature at which 10 weight % of the crystalline portion of the film is melted, relaxation of polyethylene molecules in the film is poor, and thus, there is no effect of removing the residual stress of the film; and if the temperature of heat-setting is selected from the temperature range which is higher than the temperature at which 30 weight % of the crystalline portion of the film is melted, micropores are clogged and permeability is lowered due to partial melting. The time of heat-setting should be relatively short if the temperature of heat-setting is high; whereas it may be extended relatively if the temperature of heat-setting is low. Preferably, the time for heat-setting is for about 15 seconds to 2 minutes.

The microporous polyethylene film of the present invention manufactured as described in the above has the following physical properties:

(1) It has a puncture strength of 0.17 N/μm or greater.

A puncture strength refers to the strength of a film with respect to that of a sharp article. If a microporous film is used for battery separators, the film may be torn out and a short may occur due to abnormality of the surface of electrodes or dendrites generated on the surface of electrodes while using the battery unless the puncture strength is sufficient. The film according to the present invention having a puncture strength of 0.17 N/μm or greater has a thickness of 16 μm, which is the most common among those of separator films used widely at present for commercial purposes, and has a break point weight of heavier than 272 g when it is in use. Accordingly, it may be used safely for all purposes.

(2) It has a gas permeability (Darcy's permeability constant) of $2.0\times10^{-5}$ Darcy or greater.

It is better to have a higher gas permeability. If the gas permeability is $2.0\times10^{-5}$ Darcy or greater, the efficiency of the film as a porous film is increased greatly and the ionic permeability as well as charging and discharging characteristics of the battery are improved. The film according to the present invention having a gas permeability of $2.0\times10^{-5}$ Darcy or greater has superior charging and discharging characteristics such as high-rate charging and discharging, superior low-temperature characteristics, and a long lifetime of the battery.

(3) Multiplication of its gas permeability and puncture strength is $0.45\times10^{-5}$ or greater.

Generally, there occurs a phenomenon that the puncture strength is lowered if the gas permeability is increased, whereas the gas permeability is lowered if the puncture strength is increased. Therefore, it may be said that it is a better separator having high puncture strength and gas permeability simultaneously if the multiplication of these two values is greater. Since the multiplication of the puncture strength and gas permeability of the separator according to the present invention is $0.45\times10^{-5}$ or greater, the above two characteristics are superior simultaneously.

(4) It has the ratio of shrinkage of less than 5% each in the machine and transverse directions.

A ratio of shrinkage is a value measured after the film is stood still at 105° C. for 10 minutes. If the ratio of shrinkage is high, shrinkability by heat generated during charging and discharging of the battery is increased thus harming the stability of the battery. The lower the ratio of shrinkage is, the better it is. The film according to the present invention has a ratio of shrinkage of less than 5%. It prevents a short which occurs as the separator shrinks due to internal heating of the battery and electrodes touch each other, and may be used for a separator of batteries safely.

Besides such physical properties, the microporous polyethylene film of the present invention has superior extrusion compoundability and stretchability due to relatively low molecular weight polyethylene used, comparing to ultra high molecular weight polyethylene.

The molecular weight of polyethylene and distribution of molecular weights were measured through Gel Permeation Chromatography (GPC) of Polymer Laboratory, Inc. The viscosity of a diluent was measured with CAV-4 Automatic Viscometer of Cannon Instrument Company.

Polyethylene and the diluent were compounded in a twin screw extruder where $\phi=30$ mm. There are 20 sections from the first of the twin screw extruder to the die, where each section has the same length except for the last die portion. Screws are installed as long as the length of 12 sections from the first section, and the ratio of length to diameter of the screw was 47. A gear pump is installed at the $14^{th}$ section so that sheets having a constant thickness may be produced. The residence time of the entire extruder was for about 6 minutes although it differed a little according to the nature of a composition. Particularly, since the residence time to the manometer suspended between the $13^{th}$ section and the $14^{th}$ section was for about 3 minutes, it was deemed that the time taken for passing through the $14^{th}$ to $20^{th}$ sections thereafter was also for about 3 minutes. It was calculated that it took about 26 seconds per section assuming that the time taken for passing each of the $14^{th}$ to $20^{th}$ sections was constant. In order to induce liquid-liquid phase separation inside of the extruder, experiments were performed while comparing the temperature from the $15^{th}$ section to the $20^{th}$ section with the temperature of liquid-liquid phase separation of the composition and changing it.

The molten material extruded was extruded through T-shaped dies, and molded in the form of sheets having a thickness of 600-1,200 μm by a casting roll, which were then used for stretching. In order to identify the existence of gels due to melting and inferior compounding, a film having a thickness of 200 μm was manufactured separately and the number of gels in the area of 2,000 cm$^2$ was counted. The number of gels per 2,000 cm$^2$ should be less than 20 gels in order to manufacture high-quality microporous films.

Stretching of the sheet was progressed in the simultaneous stretching manner using a tenter-type continuous stretcher while changing the ratio of stretching and temperature of stretching.

Extraction of the diluent was done in the immersion method using methylene chloride, the residence time in the extruder was for 2 minutes, and the remaining diluent in the film was processed to be less than 2%.

Heat-setting was performed, after drying the film from which the diluent was extracted in the air, by fixing the film to a tenter-type continuous frame and varying the temperature and time in a tenter.

The molded film was subject to DSC analysis in order to analyze the phenomenon of melting of the crystalline portion according to the temperature under the conditions that sample weight was 5 mg and the scanning rate was 10° C./minute.

Thus manufactured film was subject to the measurement of tensile strength, puncture strength, gas permeability, and ratio of shrinkage that were very important physical properties for microporous films. The results of measurement of physical properties are summarized below and shown in Table 1:

(1) Tensile strength was measured to be ASTM D882.

(2) Puncture strength was measured to be the strength when a pin having a diameter of 0.5 mm punctures the film at a speed of 120 mm/minute.

(3) Gas permeability was measured with a porometer (CFP-1500-AEL of PMI Co., Ltd.). Generally, gas permeability is indicated in terms of a Gurley number. But it is difficult to measure the relative permeability with respect to the pore structure of a film itself since affects of the thickness of a film are not corrected in the Gurley number. In order to solve this problem, Darcy's permeability constant was used in the present invention. Darcy's permeability constant was obtained from the following Equation 1, where nitrogen was used as the gas in the present invention:

$$C=(8FTV)(\pi D^2(P^2-1))$$ [Equation 1]

where C is the Darcy's permeability constant, F is a flow rate, T is a sample thickness, V is the viscosity of a gas (0.185 for N$_2$), D is a sample diameter, and P is pressure.

An average value of Darcy's permeability constants in the range of 100-200 psi was used in the present invention.

(4) The ratio of shrinkage was measured in terms of shrinkage in % in the machine and traverse directions after the film was stood still at 105° C. for 10 minutes.

PREFERRED EMBODIMENTS OF THE INVENTION

The foregoing and other objects, aspects, and advantages will be better understood from the following detailed description of preferred embodiments and comparative examples of the invention.

Preferred Embodiment 1

High-density polyethylene having a weight average molecular weight of $2.1\times10^5$ and a melting temperature of 135° C. was used for component I, and dibutyl phthalate (component A in the following table) was used for component II. The contents of component I and component II were 40 weight % and 60 weight %, respectively.

Phase separation was progressed by setting the temperature of 12 sections in the former portion among the total of 20 sections of the extruder to be 250° C., setting the temperature of the two $13^{th}$ and $14^{th}$ sections to be 220° C., and controlling the temperature from the $15^{th}$ section to the $20^{th}$ section to be 185° C. which was lower than the temperature of liquid-liquid phase separation of the composition. The conditions for and ratio of stretching as well as the temperature and time of heat-setting were as shown in the following table:

Preferred Embodiment 2

High-density polyethylene having a weight average molecular weight of $3.0 \times 10^5$ and a melting temperature of 134° C. was used for component I. The next processes were the same as those of the above Preferred Embodiment 1 except that the temperature of stretching was 126° C.

Preferred Embodiment 3

High-density polyethylene having a weight average molecular weight of $3.8 \times 10^5$ and a melting temperature of 132° C. was used for component I. The contents of component I and component II were 20 weight % and 80 weight %, respectively.

Stretching was done at 120° C. with a ratio of stretching of 49 times (machine direction and transverse direction=7×7). The temperature for heat-setting was set to be 118° C. and the time for 18 seconds in order to adjust the degree of melting of crystals to 20 weight %. The next processes were the same as those of the above Preferred Embodiment 1.

Preferred Embodiment 4

High-density polyethylene having a weight average molecular weight of $3.8 \times 10^5$ and a melting temperature of 133° C. was used for component I. The contents of component I and component II were 55 weight % and 45 weight %, respectively.

Stretching was done at 130° C. with a ratio of stretching of 25 times (machine direction and transverse direction=5×5). The temperature for heat-setting was set to be 118° C. and the time for 18 seconds. The next processes were the same as those of the above Preferred Embodiment 1.

Preferred Embodiment 5

High-density polyethylene used in Preferred Embodiment 4 was used for component I, and the mixture of dibutyl phthalate and a paraffin oil having a kinetic viscosity of 160 cSt at 40° C. mixed at a ratio of 2:1 (component B in the following table) was used for component II. The contents of component I and component II were 40 weight % and 60 weight %, respectively.

The temperature of extrusion of the screw part was maintained to be 230° C., and liquid-liquid phase separation was induced sufficiently by maintaining the temperature from the $14^{th}$ section to the $20^{th}$ section of the extruder at 170° C. Stretching was performed at 122° C., and the next processes were the same as those of the above Preferred Embodiment 1.

Preferred Embodiment 6

High-density polyethylene used in Preferred Embodiment 4 was used for component I, and the mixture of dibutyl phthalate and a paraffin oil having a kinetic viscosity of 160 cSt at 40° C. mixed at a ratio of 1:2 (component C in the following table) was used for component II. The contents of component I and component II were 40 weight % and 60 weight %, respectively.

The temperature of extrusion of the screw part was maintained to be 210° C., and liquid-liquid phase separation was induced sufficiently by maintaining the temperature from the $14^{th}$ section to the $20^{th}$ section of the extruder at 150° C. Stretching was performed at 122° C., and the next processes were the same as those of the above Preferred Embodiment 1.

Preferred Embodiment 7

High-density polyethylene used in Preferred Embodiment 4 was used for component I, and the mixture of oleic acid triglyceride and linoleic acid triglyceride mixed at a ratio of 1:2 (component D in the following table) was used for component II. The contents of component I and component II were 40 weight % and 60 weight %, respectively.

The temperature of extrusion of the screw part was maintained to be 210° C., and liquid-liquid phase separation was induced sufficiently by maintaining the temperature from the $14^{th}$ section to the $20^{th}$ section of the extruder at 160° C. Stretching was performed at 125° C., and the next processes were the same as those of the above Preferred Embodiment 1.

COMPARATIVE EXAMPLE 1

High-density polyethylene used in Preferred Embodiment 4 was used for component I, and dibutyl phthalate (component A in the following table) was used for component II. The contents of component I and component II were 40 weight % and 60 weight %, respectively.

Phase separation was performed after the molten material was extruded from dies after maintaining the temperature from the $14^{th}$ section to the $20^{th}$ section of the extruder at 230° C. Stretching was done at 118° C., and the next processed were the same as those of Preferred Embodiment 1.

COMPARATIVE EXAMPLE 2

High-density polyethylene used in Preferred Embodiment 4 was used for component I, and dibutyl phthalate (component A in the following table) was used for component II. The contents of component I and component II were 40 weight % and 60 weight %, respectively.

The temperature from the $14^{th}$ section to the $19^{th}$ section of the extruder was maintained to be 230° C., and the temperature of dies that are in the $20^{th}$ section was maintained to be 185° C.

Stretching was done at 118° C., and the next processed were the same as those of Preferred Embodiment 1.

COMPARATIVE EXAMPLE 3

High-density polyethylene used in Preferred Embodiment 4 was used for component I, and dibutyl phthalate (component E in the following table) was used for component II. The contents of component I and component II were 40 weight % and 60 weight %, respectively.

The temperature of extrusion of the screw part was maintained to be 200° C., and the temperature from the $14^{th}$ section to the $20^{th}$ section of the extruder was maintained to be 150° C. that was the lowest temperature at which extrusion was feasible practically. Stretching was performed at 116° C., and the next processes were the same as those of the above Preferred Embodiment 1.

COMPARATIVE EXAMPLE 4

High-density polyethylene used in Preferred Embodiment 4 was used for component I, and a paraffin oil having a kinetic viscosity of 120 cSt at 40° C. (component F in the following table) was used for component II. The contents of component I and component II were 40 weight % and 60 weight %, respectively.

Stretching was performed at 117° C., and the next processes were the same as those of Preferred Embodiment 1.

COMPARATIVE EXAMPLE 5

All processes were the same as those of Comparative Example 4 except that the contents of component I and component II were 30 weight % and 70 weight %, respectively, and the temperature of stretching was 115° C.

COMPARATIVE EXAMPLE 6

All processes were the same as those of Preferred Embodiment 1 except that high-density polyethylene having a weight average molecular weight of $1.7 \times 10^5$ was used for component I, and the temperature of stretching was 128° C.

COMPARATIVE EXAMPLE 7

All processes were the same as those of Preferred Embodiment 1 except that high-density polyethylene having a weight average molecular weight of $4.8 \times 10^5$ was used for component I, and the temperature of stretching was 125° C.

COMPARATIVE EXAMPLE 8

All processes were the same as those of Preferred Embodiment 1 except that high-density polyethylene having a weight average molecular weight of $3.8 \times 10^5$ was used for component I, the contents of components I and component II were 15 weight % and 85 weight %, respectively, and the temperature of stretching was 115° C.

COMPARATIVE EXAMPLE 9

All processes were the same as those of Preferred Embodiment 1 except that high-density polyethylene having a weight average molecular weight of $3.8 \times 10^5$ was used for component I, the contents of components I and component II were 60 weight % and 40 weight %, respectively, and the temperature of stretching was 128° C.

The conditions for experiments of the above preferred embodiments and comparative examples as well as the results obtained thus are summarized and shown in Tables 1 through 3 below:

TABLE 1

| Manufacturing condition | | Unit | Examples |||||||
|---|---|---|---|---|---|---|---|---|---|
| | | | 1 | 2 | 3 | 4 | 5 | 6 | 7 |
| High-density polyethylene (Component I) | Mw | g/mol | $2.1 \times 10^5$ | $3.0 \times 10^5$ | $3.8 \times 10^5$ | $3.8 \times 10^5$ | $3.8 \times 10^5$ | $3.8 \times 10^5$ | $3.8 \times 10^5$ |
| | Content | wt % | 40 | 40 | 20 | 55 | 40 | 40 | 40 |
| Diluent (Component II) | Component | — | A | A | A | A | B | C | D |
| | Content | wt % | 60 | 60 | 80 | 45 | 60 | 60 | 60 |
| Extrusion | Temperature at the front part of screw | ° C. | 250 * 12 | 250 * 12 | 250 * 12 | 250 * 12 | 230 * 12 | 210 * 12 | 250 * 12 |
| | Temperature at the rear part of screw | ° C. | 220 * 2 – 185 * 6 | 220 * 2 – 185 * 6 | 220 * 2 – 185 * 6 | 220 * 2 – 185 * 6 | 200 * 2 – 170 * 6 | 180 * 2 – 150 * 6 | 220 * 2 – 160 * 6 |
| | Residence time at the below temp. of phase separation | sec | 160 | 200 | 180 | 180 | 185 | 190 | 190 |
| Stretching | Temperature | ° C. | 127 | 126 | 120 | 130 | 122 | 122 | 125 |
| | Ratio (MD × TD) | ratio | 6 × 6 | 6 × 6 | 7 × 7 | 5 × 5 | 6 × 6 | 6 × 6 | 6 × 6 |
| Heat-setting | Temperature | ° C. | 120 | 120 | 118 | 117 | 120 | 120 | 120 |
| | Molten Crystal | wt % | 20 | 20 | 20 | 10 | 20 | 20 | 20 |
| | Time | sec | 15 | 15 | 18 | 20 | 15 | 15 | 15 |
| Number of gels in sheet | | #/2000 cm² | 2 | 6 | 7 | 3 | 2 | 3 | 3 |
| Film thickness | | μm | 16 | 16 | 17 | 16 | 16 | 16 | 16 |
| Puncture Strength | | N/μm | 0.18 | 0.24 | 0.18 | 0.28 | 0.22 | 0.23 | 0.22 |
| Air Permeability | | $10^{-5}$ Darcy | 3.8 | 2.8 | 5.0 | 2.1 | 2.8 | 2.7 | 2.3 |
| Puncture * Permeability | | $10^{-5}$ Darcy, N/μm | 0.68 | 0.67 | 0.90 | 0.59 | 0.62 | 0.62 | 0.51 |
| Shrinkage | MD | % | 3.5 | 3.5 | 4.3 | 3.7 | 3.2 | 3.3 | 3.8 |
| | TD | | 1.5 | 1.8 | 2.5 | 3.4 | 1.6 | 1.7 | 1.9 |

TABLE 2

| Manufacturing condition | | Unit | Comparative Examples | | | | |
|---|---|---|---|---|---|---|---|
| | | | 1 | 2 | 3 | 4 | 5 |
| High-density polyethylene (Component I) | Mw | g/mol | $3.8 \times 10^5$ | $3.8 \times 10^5$ | $3.8 \times 10^5$ | $3.8 \times 10^5$ | $3.8 \times 10^5$ |
| | Content | wt % | 40 | 40 | 40 | 40 | 30 |
| Diluent (Component II) | Component | — | A | A | E | F | F |
| | Content | wt % | 60 | 60 | 60 | 60 | 70 |
| Extrusion | Temperature at the front part of screw | °C. | 250 * 12 | 250 * 12 | 200 * 12 | 250 * 12 | 250 * 12 |
| | Temperature at the rear part of screw | °C. | 230 * 8 | 230 * 7 – 185 * 1 | 150 * 8 | 230 * 2 – 185 * 6 | 230 * 2 – 185 * 6 |
| | Residence time at below temp. of phase separation | sec | 0 | 26 | 0 | no liquid-liquid separation temp. | no liquid-liquid separation temp. |
| Stretching | Temperature | °C. | 118 | 118 | 116 | 117 | 115 |
| | Ratio (MD × TD) | ratio | 6 × 6 | 6 × 6 | 6 × 6 | 6 × 6 | 6 × 6 |
| Heat-setting | Temperature | °C. | 120 | 120 | 120 | 120 | 120 |
| | Molten crystal | wt % | 20 | 20 | 20 | 20 | 20 |
| | Time | sec | 15 | 15 | 15 | 15 | 15 |
| Number of gels in sheet | | #/2000 cm² | 5 | 4 | 6 | 3 | 5 |
| Film thickness | | μm | 16 | 16 | 16 | 15 | 16 |
| Puncture Strength | | N/μm | 0.21 | 0.20 | 0.20 | 0.18 | 0.14 |
| Air Permeability | | $10^{-5}$ Darcy | 1.7 | 1.8 | 1.9 | 1.8 | 2.3 |
| Puncture * Permeability | | $10^{-5}$ Darcy, N/μm | 0.36 | 0.36 | 0.38 | 0.32 | 0.32 |
| Shrinkage | MD | % | 3.2 | 3.4 | 3.5 | 3.2 | 4.1 |
| | TD | | 1.8 | 1.7 | 2.1 | 1.7 | 2.1 |

TABLE 3

| Manufacturing condition | | Unit | Comparative Examples | | | |
|---|---|---|---|---|---|---|
| | | | 6 | 7 | 8 | 9 |
| High-density polyethylene (Component I) | Mw | g/mol | $1.7 \times 10^5$ | $4.8 \times 10^5$ | $3.8 \times 10^5$ | $3.8 \times 10^5$ |
| | Content | wt % | 40 | 40 | 15 | 60 |
| Diluent (Component II) | Component | — | A | A | A | A |
| | Content | wt % | 60 | 60 | 85 | 40 |
| Extrusion | Temperature at the front part of screw | °C. | 250 * 12 | 250 * 12 | 250 * 12 | 250 * 12 |
| | Temperature at the rear part of screw | °C. | 230 * 2 – 185 * 6 | 230 * 2 – 185 * 6 | 230 * 2 – 185 * 6 | 230 * 2 – 185 * 6 |
| | Residence time at below temp. of phase separation | sec | 160 | 210 | 170 | 190 |
| Stretching | Temperature | °C. | 128 | 125 | 115 | 128 |
| | Ratio (MD × TD) | ratio | 6 × 6 | 6 × 6 | 7 × 7 | 5 × 5 |
| Heat-setting | Temperature | °C. | 120 | 120 | 118 | 117 |
| | Molten crystal | wt % | 20 | 20 | 20 | 10 |
| | Time | sec | 15 | 15 | 15 | 15 |
| Number of gels in sheet | | #/2000 cm² | 5 | 25 | 35 | 17 |
| Film thickness | | μm | 16 | 16 | 17 | 16 |
| Puncture Strength | | N/μm | 0.15 | 0.25 | 0.10 | 0.29 |
| Air Permeability | | $10^{-5}$ Darcy | 2.6 | 2.3 | 4.6 | 1.2 |
| Puncture * Permeability | | $10^{-5}$ Darcy, N/μm | 0.39 | 0.58 | 0.46 | 0.35 |
| Shrinkage | MD | % | 3.5 | 5.2 | 3.3 | 6.0 |
| | TD | | 1.5 | 3.1 | 2.5 | 4.6 |

As shown in the above Tables 1 through 3, the polyethylene microporous film manufactured according to the present invention may contribute to an increased productivity of stable products as its extrusion and stretching may be done readily. And thus manufactured product may be used for battery separators and various filters owing to its high gas permeability, superior puncture strength, and small ratio of shrinkage.

The present invention has been described in an illustrative manner, and it is to be understood that the terminology used is intended to be in the nature of description rather than of limitation. Many modifications and variations of the present invention are possible in light of the above teachings. Therefore, it is to be understood that, within the scope of the appended claims, the invention may be practiced otherwise than as specially described.

What is claimed is:

1. A method of manufacturing a microporous polyethylene film, comprising the steps of:
   melt-mixing a resin mixture, containing 20-55 weight % of polyethylene (component I) and 80-45 weight % of a diluent (component II) having a liquid-liquid phase separation property from the polyethylene (the component I) at a liquid-liquid separation temperature of 160-280° C., at a temperature higher than the liquid-liquid phase separation temperature to make a molten material of thermodynamic single phase,
   carrying out liquid-liquid phase separation by passing the molten material of single phase through a phase separating zone which is maintained at a temperature which is lower than the temperature of liquid-liquid phase separation −10° C. for a residence time of longer than 30 seconds;
   molding the liquid-liquid separated molten material in the form of a sheet;
   stretching the sheet in the form of a film;
   extracting the diluent (component II) from the film to make a microporous polyethylene film and drying the microporous polyethylene film; and
   heat-setting the dried microporous polyethylene film by removing residual stress to have a shrinkage percentage of the film of 5% or less.

2. The method of claim 1, wherein the phase separating zone is provided in an extruder.

3. The method of claim 1, characterized by that the polyethylene has a average molecular weight in the range of from $2 \times 10^5$ to $4.5 \times 10^5$.

4. The method of claim 1, characterized by that said component II is one or more components selected from phthalic acid esters selected from the group consisting of dibutyl phthalate, dihexyl phthalate and dioctyl phthalate; aromatic ethers selected from the group consisting of diphenyl ether and benzyl ether; aliphatic acids having 10 to 20 carbon atoms selected from the group consisting of palmitic acid, stearic acid, oleic acid, linoleic acid and linolenic acid; aliphatic alcohols having 10 to 20 carbon atoms selected from the group consisting of palmityl alcohol, stearyl alcohol and oleyl alcohol; and among saturated and unsaturated fatty acids having 4 to 26 carbon atoms in the fatty acid group, fatty acid esters in which one or more fatty acids are combined through esterification with alcohols having 1 to 8 hydroxy radicals and 1 to 10 carbon atoms selected from the group consisting of palmitic acid mono-, di-, or triester; stearic acid mono-, di-, or triester; oleic acid mono-, di-, or triester; and linoleic acid mono-, di-, or triester.

5. The method of claim 4, characterized by that said component II further contains one or more components selected from the group consisting of a paraffin oil, mineral oil, and wax.

6. The method of claim 1, characterized by that the molding of the liquid-liquid separated molten material is molded in the form of a sheet by extruding through a die or by a casting or calendering method using a water-cooling and air-cooling method.

7. The method claim 1, characterized by that said heat-setting is done within a temperature range within which 10-30 weight % of the crystalline portion of the extracted and dried film is molten in the tenter method in which the time for heat-setting is for 15 seconds to 2 minutes.

8. The microporous polyethylene film manufactured according to a method in claim 1.

9. The microporous polyethylene film of claim 8, characterized by that said microporous polyethylene film has a gas permeability (Darcy's permeability constant) of $2.0 \times 10^{-5}$ or greater, puncture strength of 0.17 N/μm or greater, multiplication of said gas permeability and said puncture strength of $0.45 \times 10^{-5}$ Darcy. N/μm or greater, and ratio of shrinkage in each of machine and traverse directions of 5% or less.

10. The microporous polyethylene film manufactured according to a method in claim 2.

11. The microporous polyethylene film manufactured according to a method in claim 3.

12. The microporous polyethylene film manufactured according to a method in claim 4.

13. The microporous polyethylene film manufactured according to a method in claim 5.

14. The microporous polyethylene film manufactured according to a method in claim 6.

15. The microporous polyethylene film manufactured according to a method in claim 7.

* * * * *